(12) United States Patent
Leontaris et al.

(10) Patent No.: US 9,699,454 B2
(45) Date of Patent: Jul. 4, 2017

(54) RATE CONTROL FOR VIDEO SPLICING APPLICATIONS

(71) Applicant: Dolby Laboratories Licensing Corporation, San Francisco, CA (US)

(72) Inventors: Athanasios Leontaris, Mountain View, CA (US); Alexandros Tourapis, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/938,653

(22) Filed: Nov. 11, 2015

(65) Prior Publication Data

US 2016/0065957 A1    Mar. 3, 2016

Related U.S. Application Data

(63) Continuation of application No. 13/784,677, filed on Mar. 4, 2013, now Pat. No. 9,197,888.
(Continued)

(51) Int. Cl.
*H04N 19/102* (2014.01)
*H04N 19/177* (2014.01)
(Continued)

(52) U.S. Cl.
CPC ......... *H04N 19/102* (2014.11); *H04N 19/115* (2014.11); *H04N 19/14* (2014.11);
(Continued)

(58) Field of Classification Search
CPC .. H04N 19/102; H04N 19/177; H04N 19/115; H04N 19/14; H04N 19/192; H04N 19/436
(Continued)

(56) References Cited

U.S. PATENT DOCUMENTS 5,764,293 A    6/1998   Uz
5,929,916 A    7/1999   Legall
(Continued)

FOREIGN PATENT DOCUMENTS

WO    2005/125218    12/2005
WO    2011/084916     7/2011

OTHER PUBLICATIONS

ITU-T H.264 Advanced Video Coding for Generic Audiovisual Services, Jan. 2012.

*Primary Examiner* — Hee-Yong Kim

(57) ABSTRACT

Rate control techniques are provided for encoding an input video sequence into a compressed coded bitstream with multiple coding passes. The final coding pass may comprise final splices with non-overlapping frames that do not extend into neighboring final splices. A final splice in the final coding pass may correspond to at least one non-final splice in a non-final coding pass. A non-final splice may have overlapping frames that extend into neighboring final splices in the final coding pass. The overlapping frames in the non-final splice may be used to derive complexity information about the neighboring final splices. The complexity information about the neighboring final splices, as derived from the overlapping frames, may be used to allocate or improve rate control related budgets in encoding the final splice into the compressed coded bitstream in the final coding pass.

2 Claims, 8 Drawing Sheets

Related U.S. Application Data

(60) Provisional application No. 61/610,407, filed on Mar. 13, 2012.

(51) Int. Cl.

| | | |
|---|---|---|
| *H04N 7/12* | (2006.01) | |
| *H04N 11/02* | (2006.01) | |
| *H04N 11/04* | (2006.01) | |
| *H04L 12/70* | (2013.01) | |
| *H04N 19/115* | (2014.01) | |
| *H04N 19/14* | (2014.01) | |
| *H04N 19/192* | (2014.01) | |
| *H04N 19/436* | (2014.01) | |

(52) U.S. Cl.
CPC ......... *H04N 19/177* (2014.11); *H04N 19/192* (2014.11); *H04N 19/436* (2014.11)

(58) Field of Classification Search
USPC .................................................. 375/240.12
See application file for complete search history.

(56) References Cited

U.S. PATENT DOCUMENTS

| | | | |
|---|---|---|---|
| 6,226,608 | B1 | 5/2001 | Fielder |
| 6,501,800 | B1 | 12/2002 | Sawada |
| 6,522,693 | B1 | 2/2003 | Lu |
| 7,346,106 | B1 | 3/2008 | Jiang |
| 8,325,800 | B2* | 12/2012 | Holcomb ............ H04N 19/147 375/240.03 |
| 2003/0138045 | A1 | 7/2003 | Murdock |
| 2004/0017852 | A1 | 1/2004 | Garrido |
| 2004/0114817 | A1 | 6/2004 | Jayant |
| 2004/0264580 | A1 | 12/2004 | Yin |
| 2005/0179567 | A1 | 8/2005 | Apostolopoulos |
| 2005/0179568 | A1 | 8/2005 | Wee |
| 2006/0159169 | A1 | 7/2006 | Hui |
| 2006/0204115 | A1 | 9/2006 | Burazerovic |
| 2007/0064793 | A1 | 3/2007 | Wang |
| 2007/0116117 | A1 | 5/2007 | Tong |
| 2008/0056358 | A1 | 3/2008 | Fuchie |
| 2009/0279600 | A1 | 11/2009 | Au |
| 2010/0061448 | A1 | 3/2010 | Zhou |
| 2010/0226430 | A1 | 9/2010 | Hamilton |
| 2013/0275602 | A1* | 10/2013 | Havekes ............ H04L 41/0893 709/226 |

* cited by examiner

RATE CONTROL FOR VIDEO SPLICING APPLICATIONS

CROSS REFERENCE TO RELATED APPLICATIONS

This Application is a continuation application of U.S. patent application Ser. No. 13/784,677 filed on Mar. 4, 2013, which claims the benefit of priority to U.S. Provisional Patent Application Ser. No. 61/610,407 filed on Mar. 13, 2012 entitled "Overlapped Rate Control for Video Splicing Applications" by Athanasios Leontaris et. al., hereby incorporated by reference in its entirety.

TECHNOLOGY

The present invention relates generally to video coding and more particularly to rate control in video coding.

BACKGROUND

Rate control is an integral component of modern video compression systems. A compressed bit stream satisfies specific bandwidth and delay constraints that are imposed by the transmission medium. These constraints can be satisfied through rate control. Rate control algorithms vary the number of bits allocated to each picture, color component, set of blocks, or individual blocks, so that encoder and decoder buffer overflows and underflows may be avoided, and the target bit rate may be achieved with high accuracy. A basic unit may be a collection of adjacent pictures (or frames). Bit rate and complexity statistics may vary greatly among splices.

An objective of a video compression system is high compression performance, e.g., to achieve the lowest possible distortion given a fixed target number of bits for the compressed bit stream or equivalently to send the minimum possible number of bits for a fixed distortion value. An example of distortion measurement is peak signal-to-noise ratio (PSNR). Video encoders produce a compressed bit stream such that when a compliant decoder mechanism (e.g., a hypothetical reference decoder) decodes the compressed bit stream, a reconstructed video sequence is generated that can be displayed and viewed at a receiver side. It should be appreciated that a storage or transmission medium can send such a compressed bit stream to a receiver to be decoded in a variety of transport modes. Each one of these transport modes can have different delay and bandwidth constraints. Streaming the same bitstream over a network that lacks bandwidth to support such a bit rate may affect performance.

A mechanism for generating compressed bit streams that satisfy the bandwidth and delay constraints is rate control. Rate control may minimize visual distortion, generate bits that fit the communication channel, and may deter decoder input buffer overflow or starvation (e.g., that may result in an underflow).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
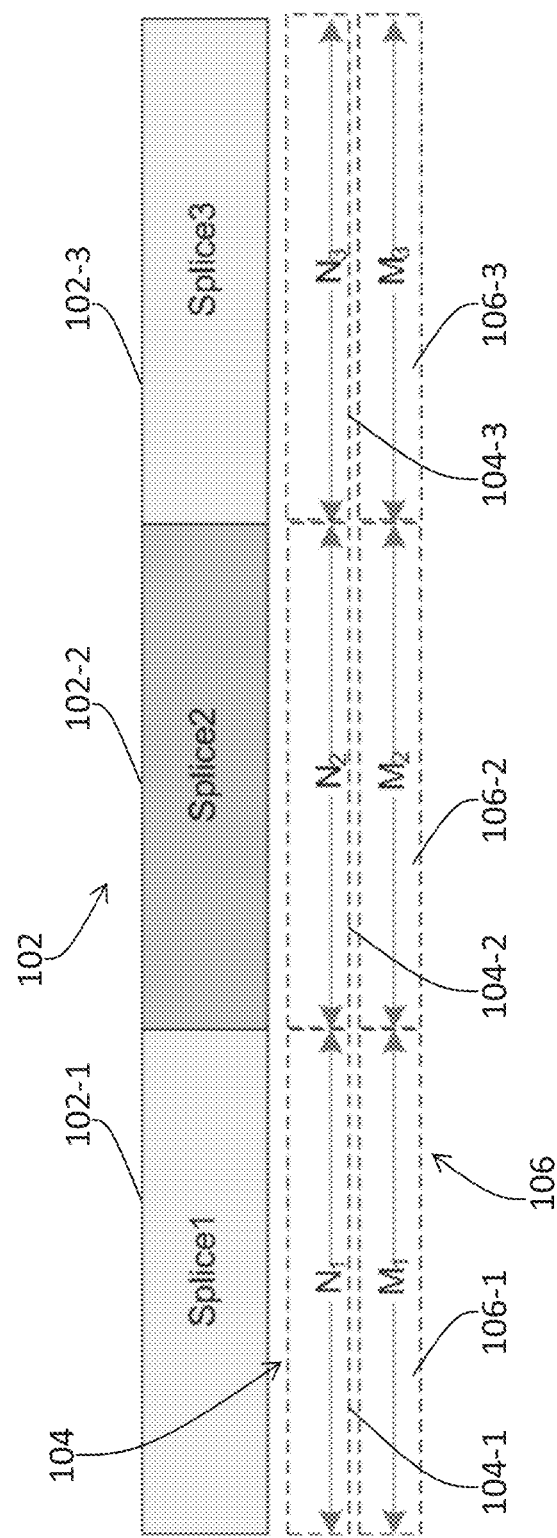
FIG. 1 illustrates a video sequence divided into multiple splices for multi-pass coding under some techniques.

Example embodiments, which relate to rate control in video coding, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. RATE CONTROL
3. MULTIPLE-PASS RATE CONTROL ENCODING SYSTEMS
4. EXAMPLE PROCESS FLOWS
6. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

Rate control techniques are provided for encoding an input video sequence with multiple coding passes. The input video sequence may be covered by a set of splices in a coding pass to facilitate parallel processing. For instance, the input video sequence may be covered by a set of (final) splices in the final coding pass. A final splice comprises a number of frames that do not overlap with neighboring frames in neighboring final splices (adjacent to the final splice).

A non-final splice in a non-final coding pass may correspond to one or more final splices in the set of final splices in the final coding pass. In contrast to a final splice comprising non-overlapping frames, a non-final splice that corresponds to a final splice may comprise both non-overlapping frames that are located within the final splice and overlapping frames that extend into neighboring final splices adjacent to the final splice.

The overlapping frames in the non-final splice may belong to neighboring final splices and hence may be used to derive information about the neighboring final splices. The information about the neighboring final splices, as derived from the overlapping frames, may be used to allocate or improve rate control related budgets in encoding frames in the final splice into the compressed coded bitstream in the final coding pass. For example, if the information derived from the overlapping frames of a particular final splice indicates that a neighboring final splice to the particular final splice is difficult to code or contains frames that need details for downstream decoders, bit allocation for the particular final splice may be decreased and saved bits may be allocated to the neighboring final splice. On the other hand, if information derived from overlapping frames of a particular final splice indicates that a neighboring final splice is easy to code or contains frames that do not need as much details as possible, bit allocation for the particular final splice may be increased to improve coding quality of the particular final splice.

In some embodiments, a multi-pass encoding system as described herein may be configured to perform global and/or splice-specific operations including but not limited to global bit allocation, based on neighboring overlapping information, to improve subjective and objective qualities of the overall compressed video bitstream.

In some embodiments, a final splice and one or more corresponding non-final splices may be processed by splice processing units (or rate control modules) that require no communication with other splice processing units that operate on other final splices and non-final splices corresponding to the other final splices. Thus, in these embodiments, splicing processing units are configured to obtain information about neighboring splices without communicating with other splicing processing units that process these neighboring splices, and to perform efficient and high-performance parallel processing of the input video sequence.

Sizes of overlapping portions in terms of numbers of overlapping frames (e.g., in splices of a non-final coding pass) may be preconfigured, or dynamically adjusted, for example, based on results indicated by prior coding passes. In some embodiments, a pre-analysis coding pass may be used to generate overall and/or local statistics about the input video sequence. The statistics may be taken into consideration in deciding sizes of overlapping portions for non-final splices in subsequent non-final coding passes in a global and/or location dependent way for various locations of the input video sequence.

In some embodiments, overlapping frames, which are not be coded during the final coding pass, may be coded/represented in a non-final coding pass with a computational complexity and/or with a spatial resolution lower than that with which non-overlapping frames are coded/represented in the non-final coding pass. For example, spatial and/or temporal subsampling may be used to process overlapping frames in non-final coding passes for the purpose of reducing computational time.

In some example embodiments, mechanisms as described herein form a part of a media processing system, including but not limited to any of: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Rate Control

Rate control is a component that performs a critical function in a video encoder. Rate control under techniques as described herein ensures that a generated compressed video bitstream (a) achieves a specific target bit rate, (b) satisfies maximum average bit rate constraints, and (c) satisfies reference decoder (e.g., buffering delay) constraints, among others. Given specific bit rate and buffering constraints, rate control may also be used to optimize the video quality of the compressed video bitstream.

Satisfying constraint (a) ensures that the compressed video bitstream fits the communication pipe or storage space used for transmission and buffering. For example, a wireless network may only allow up to 768 kbps for video transmission. This is in contrast to, for example, a Blu-Ray disc device, which may allow up to 40 Mbps of bandwidth for 2D video applications and 60 Mbps of bandwidth for 3D video applications. These video applications may be configured to use codecs, for example, based on an H.264/MPEG-4 AVC video coding standard.

In some embodiments in which very high bandwidth is provided (e.g., for applications such as archival applications reading from a hard drive), in addition to, or in place of, constraint (a), one may optionally and/or alternatively specify a constraint for a total size of a (final) generated bitstream file.

Constraint (b) is an important aspect as playback devices may be configured to only store and decode a certain number of bits per second. During an encoding process, the average bit rate for the entire compressed bitstream may achieve a configured target bit rate, but the average bit rate for individual portions of the compressed bitstream may exceed the configured target bit rate locally, for example for a duration of some seconds. Often this happens because difficult-to-code portions usually require additional bits (or bitstream "spikes") to ensure consistently high video quality. However, these bitstream "spikes", provided they are large enough, may create problems for resource-constrained decoders. Problems that affect such a decoder include either overflowing internal buffers or an inability to decode the bitstream in time to display frames in the correct order and with proper timing. Significantly, constraint (c) is closely related to constraint (b) and can be thought of as a more rigorous set of requirements that a compressed video bitstream has to satisfy. In short, the compressed video bitstream has to be coded such that, if transmitted at the target bit rate, the compressed video bitstream does not cause a decoder buffer overflow or underflow, and as a result, video decoded from the compressed video bitstream does not stall or stop during playback.

To ensure the best possible video quality given the above bit rate and buffering constraints, rate control may be accomplished with more than one coding pass. For example, rate control may use information drawn from one or more non-final coding passes to best meet the bit rate and performance constraints in the final coding pass.

Examples of the information drawn from non-final coding passes may include, but are not limited to any of, complexity measures, such as the number of header bits and the number of texture bits generated for a specific frame type and the quantization parameter (QP). The information may be used to improve bit rate accuracy and help satisfy the bit rate and buffering constraints.

As used herein, header bits may comprise bits used to code motion information, coding modes, block types, parameter sets, as well as information (such as video usability descriptors) optional to a decoding process. Texture bits may comprise bits used to code transformed coefficients of inter or intra prediction residuals. In some embodiments, the texture bits form the bulk of a compressed video bitstream especially for high bit rate video applications.

Besides being used for rate control purposes, the information drawn from non-final coding passes may also be used to greatly improve the quality of the compressed video bitstream. For example, the availability of coding statistics for a video sequence enables one to efficiently allocate bits in segments of the video sequence where the bits generate the most beneficial results (e.g., as measured in terms of rate-distortion performance). Allocation of additional bits in difficult-to-code portions (e.g., high motion scenes, scenes with lots of texture, fades, scene changes, flashes, etc.) as compared to, for example, static scenes, improves the overall quality, both subjectively and objectively. The more coding passes, the better the video quality that may be achieved given a configured bit rate budget. However, there may exist a point of diminishing returns, beyond which the return on coding gain may be trivial compared to added computational costs. Hence, there is a need to constrain computational complexity during multiple-pass coding.

To implement rate control video encoding with multiple processors and/or computers, it may be computationally efficient to break up a video sequence into segments (splices) and to code individual segments in parallel. The coding of an individual segment may be performed independently of the coding of all other segments. Multiple-pass coding may be applied in coding frames in each individual final splice of the video sequence. After all final splices have been coded into their respective compressed video bitstreams, the compressed video bitstreams from all final splices may be combined to form an overall compressed video bitstream for the video sequence.

FIG. 1 illustrates a video sequence (102) divided into multiple splices for multi-pass coding, in an example embodiment. The video sequence 102 is divided into a plurality of segments or splices. For the purpose of illustration only, the number of splices in the video sequence 102 is S splices in total. Three splices (e.g., 102-1 through 102-3) of the video sequence (102) are depicted in FIG. 1. Multiple-pass coding may be applied with at least two coding passes. For the purpose of illustration only, the number of coding passes is P (which is an integer greater than one (1)) passes in total. Three splices (e.g., 104-1 through 104-3) of one or more first (P−1) coding passes (104) and three splices (e.g., 106-1 through 106-3) of the final coding pass (106) are depicted in FIG. 1.

For splice i (which may equal 1, 2, 3, or another integer) of the video sequence (102), Ni frames may be considered in the first (P−1) coding passes (104) and Mi frames are considered during the final coding pass (106). Under these techniques, multiple-pass rate control algorithms may code the same sets of frames in each coding pass (any of the P coding passes 104 and 106) yielding Ni=Mi.

Under these techniques, compression performance may deteriorate, since bit allocation may only be adapted within each individual splice. Furthermore, buffering and/or average bit rate requirements may be violated at boundaries between adjacent splices, since each splice may have been coded independently. Hence, while they are useful in terms of speeding up encoding jobs, splicing as illustrated in FIG. 1—which is different from that under techniques as described herein—may create severe video quality, buffering, and average bit rate issues.

In contrast, techniques as described herein may be used to perform multiple-pass rate control in splicing that improves compression performance and helps meet bit rate and buffering constraints. Under the techniques as described herein, each coding pass need not consider the same set of frames or the same number of frames for a given splice of a video sequence.

Figure 2:
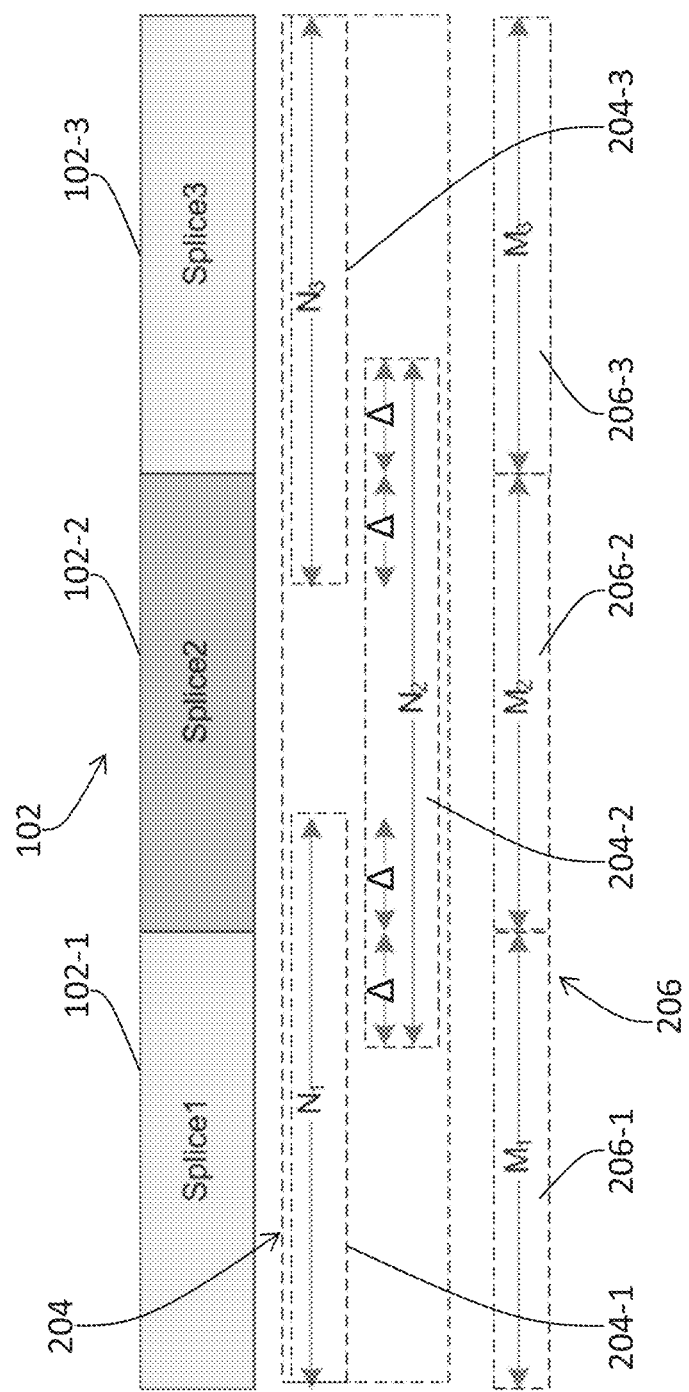
FIG. 2 illustrates a video sequence covered by splices comprising different numbers of frames in different coding passes in an example embodiment.

FIG. 2 illustrates a video sequence covered by splices comprising different numbers of frames in different coding passes in an example embodiment. For the purpose of illustration, the video sequence may be the same as the video sequence (102) of FIG. 1.

Under techniques as described herein, at least two coding passes, for example P (which is an integer greater than one (1)) coding passes (e.g., 204 and 206) in total, may be used to code the video sequence (102) into a compressed video bitstream. In some embodiments, P is two (2); thus, in these embodiments, 204 of FIG. 2 represents a first coding pass, while 206 of FIG. 2 represents a second and final coding pass. In some embodiments, P is two or more; thus; in those other embodiments, 204 of FIG. 2 represents one or more first coding passes, while 206 of FIG. 2 represents the last coding pass.

As used herein, the terms "corresponding splices" refer to a splice of a video sequence and two or more splices, in respective coding passes, that cover the splice of the video sequence. Different sets and numbers of frames may be coded in corresponding splices in the P coding passes.

In some embodiments, the number of frames considered in a splice in a coding pass may be greater than or equal to the number of frames considered in a corresponding splice in a successive coding pass. For example, three coding passes comprising a first coding pass, a second coding pass and a final coding pass may be used to process a video sequence. A first number of frames considered in a splice in the first pass may be greater than or equal to a second number of frames considered in a corresponding splice in the second coding pass. The second number of frames considered in the corresponding splice in the second pass may be greater than or equal to a third number of frames considered in a corresponding splice in the third and final coding pass.

As illustrated in FIG. 2, Ni frames may be considered in a splice in one or more first (P−1) coding passes (204), and Mi frames may be considered in a corresponding splice in the final coding pass (206). Ni may be equal to or greater than Mi. In some embodiments, the number of frames considered in at least one splice (e.g., 204-2) in non-final (P−1) coding passes (204) is greater than the number of frames considered in a corresponding splice (206-2) in the final coding passes (206).

This leads to overlaps between sets of frames (e.g., N2 in splice 204-2) considered in one or more non-final coding passes (204) for a splice (102-2) of a video sequence (102) and sets of frames (M1 in splice 206-1 and M3 in splice 206-3) considered in subsequent passes (206) for its neighboring splices (102-1 and 102-3) of the video sequence (102). Such an overlap may be as small as zero or more than one splice of the entire video sequence. This results to processing more frames in the non-final coding passes than those actually coded in the final coding pass.

As illustrated in FIG. 2, a splice (e.g., 204-2) in one of the one or more first coding passes (e.g., 204) may overlap its neighboring splices (204-1 and 204-3) in coding pass (204) by a number of frames, for example 2Δ frames. In contrast, a splice (206-2) in the final coding pass (206) does not overlap its neighboring splices (206-1 and 206-3) in the same final coding pass (206). In these embodiments, splices (e.g., 102-1 through 102-3) of the video sequence match corresponding splices (206-1 through 206-3) of the final coding pass (206) in terms of numbers of frames in splices respectively in the video sequence (102) and in the final coding pass (206).

In some embodiments, the set of frames (e.g., N2) considered in a splice (204-2) in a coding pass (204) extends into a splice (e.g., 102-1), of a video sequence (102), to which the splice (204-2) in the coding pass (204) does not correspond. For example, the set of frames considered in splice (204-2) has an overlapping portion (e.g., Δ overlapping frames), among its total N2 frames, that are frames in splice 102-1 of the video sequence 102.

In some embodiments, overlapping frames (e.g., the Δ overlapping frames of splice 204-2) considered in a splice (204-2) of a non-final coding pass (204) are not coded into a compressed video bitstream for a corresponding splice (206-2) in the final coding pass (206). However, the overlapping frames considered in the non-final coding pass (204) may be used to evaluate complexity of the splice (102-1) of the video sequence (102) which the overlapping frames overlap. Results of this complexity evaluation from the non-final coding pass (204) may be used to improve rate control for a corresponding splice (206-2) in the final coding pass (206). The rate control improvement based on results of complexity evaluation of frames overlapping adjacent splices, as described herein, may be repeatedly performed for each splice (e.g., 102-1, 102-2, 102-3, etc.) of a video sequence (102).

As discussed above, frames considered in a splice (e.g., 204-2) of a non-final coding pass (204) may comprise overlapping frames that are not coded in a corresponding splice (206-2) of the final coding pass (206), and non-overlapping frames that are coded in the corresponding splice (206-2) of the final coding pass (206). In one embodiment, if the overlapping frames are of higher average complexity (more difficult to code or more critical for subjective quality) than the non-overlapping frames, a rate control module implementing techniques as described herein may reduce the number of bits allocated for the corresponding splice (206-2) of the final coding pass (206) so that bits may be saved and used for coding other splices (e.g., 206-1 or 206-3) with higher complexity than that of the corresponding splice (206-2) of the final coding pass (206).

On the other hand, if the overlapping frames are of lower average complexity (less difficult to code or less critical for subjective quality) than the non-overlapping frames, the rate control module may increase the number of bits allocated for the corresponding splice (206-2) of the final coding pass (206).

In some embodiments, a rate control system as described herein may calculate a bit target for a splice (102-1, 102-2, 102-3, etc.) of a video sequence (102) as if overlapping frames (e.g., Δ overlapping frames within Ni frames) considered in a corresponding splice (204-1, 204-2, 204-3, etc.) of a non-final coding pass (204) were to be coded in the final coding pass (206). The rate control system may allocate one or more such bit targets for one or more splices (102-1, 102-2, 102-3, etc.) of the video sequence (102) in the final coding pass (206). The multi-pass encoding system may still code non-overlapping frames (e.g., Mi frames) for a splice of the final coding pass (206). However, the multi-pass encoding system may perform one or more global and/or splice-specific operations, based on neighboring overlapping information, to improve subjective and objective qualities of the overall compressed video bitstream.

In some embodiments, sizes of overlapping portions comprising overlapping frames (e.g., in splices of a non-final coding pass) may be arbitrarily chosen. In an example, the same number of overlapping frames is chosen for all overlapping portions. Additionally, optionally, or alternatively, one of a plurality of numbers of overlapping frames may be chosen for a specific overlapping portion between a splice of a non-final coding pass and a neighboring splice of the final coding pass.

In some embodiments, sizes of overlapping portions may be chosen based on one or more criteria including, but not limited to any of, sequence/splice statistics and encoder constraints. Information about the content (e.g., sequence/splice statistics) may be made available through one or more preliminary stages of pre-analysis. The information about the content may then be used to adapt the size of overlapping portion for each splice (e.g., in a non-final coding pass).

An example of criterion for deciding the size of an overlapping portion of a splice (e.g., 204 of FIG. 2) of a non-final coding pass (204) may be the similarity of a corresponding splice (102-2) of a video sequence (102) with neighboring splices (102-1 and 102-3) of the video sequence (102). For example, there may be little incentive to have a large overlapping portion when the content involved in two neighboring splices of the video sequence (102) is similar across the two neighboring splices. Thus, in some embodiments, if frame complexities (which may be available through the one or more pre-analysis stages) or spatial and/or temporal statistics appear sufficiently similar, then the overlapping portion may be reduced in size. Otherwise, the overlapping portion may be increased in size.

In some embodiments, overlapping frames, which are not be coded during the final coding pass, may be coded/represented in a non-final coding pass either with a computational complexity and/or a spatial resolution lower than that with which non-overlapping frames are coded/represented in the non-final coding pass. In some embodiments, instead of using a full frame size, one or more segments or partial splices (e.g., cropping) of overlapping frames may be used to represent the overlapping frames in a non-final coding pass. In some embodiments, temporal sub-sampling may be used to employ a subset of overlapping frames to represent the overlapping frames in a non-final coding pass. These spatial or temporal sub-sampling strategies for reducing computational complexity and/or spatial/temporal resolution may be regular (e.g. one out of every two overlapping frames), arbitrary (e.g. some random sampling pattern among the overlapping frames), or be guided using some a priori knowledge (e.g. through pre-analysis) about the content. Additionally, optionally, or alternatively, when information about the content is incorporated in adopting specific spatial or temporal sub-sampling strategies, overlapping frames constituting more "interesting" areas such as high motion segments, scene change frames, etc., may be coded/represented with relatively high computational details and high spatial/temporal resolutions than less "interesting" areas that lack of such features.

3. Multiple-Pass Rate Control Encoding Systems

Figure 3:
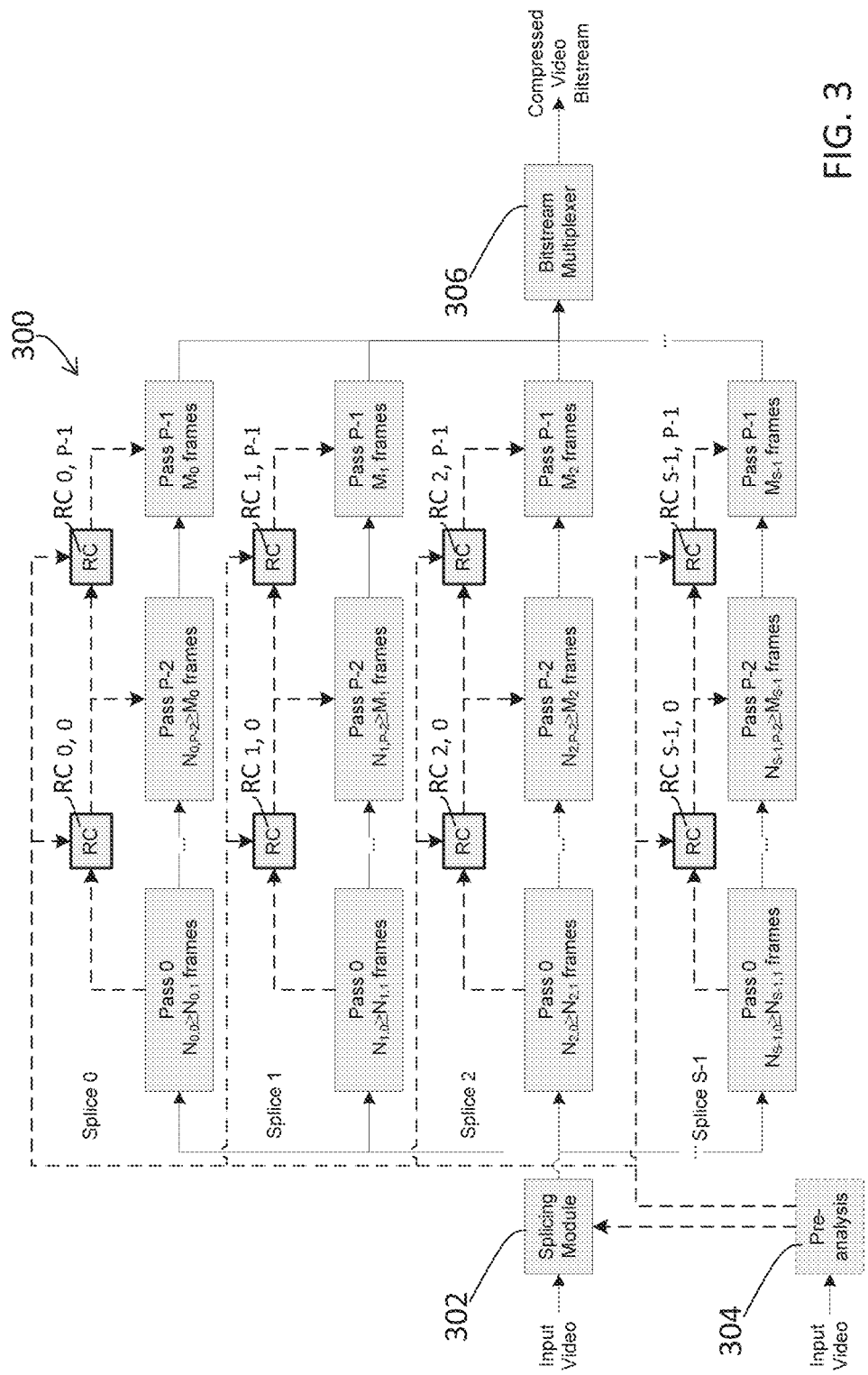
FIG. 3 illustrates a block diagram of a multi-pass rate control encoding system (300), in an example embodiment.

FIG. 3 illustrates a block diagram of a multi-pass rate control encoding system (300), in an example embodiment. For a total number of coding passes (P) no less than two (2), the numbers of frames in corresponding splices of the P coding passes for a given splice i of the video sequence (102) may vary from one coding pass to another. For the purpose of illustration only, $N_{i,j}$ may be used to denote the number of frames considered during the j-th coding pass of the i-th splice of a video sequence; hence, these $N_{i,j}$ frames considered in the j-th coding pass constitute a corresponding splice in the j-th coding pass for the i-th splice of the video sequence. The first index i takes values from 0 to S−1, where S is the number of splices in a video sequence. The second index j takes values from 0 to P−1, where P is the number of coding passes. For the purpose of illustrations, when j equals (P−1) in the final coding pass, $N_{i,j}$ may also be denoted as $M_i$.

A splicing module (302) in the rate control encoding system (300) may be configured to receive an input video sequence and sub-divide it into splices (frame subsets) that may be coded by different encoders. Additionally, optionally, or alternatively, the splicing module (302) may be configured to determine initial overlapping portions for individual coding passes. These initial overlapping portions may be further modified in subsequent coding passes. For example, rate control (RC) modules (RCi, j, where i is an integer of 0 to (S−1), and j is an integer of 0 to (P−1)) in the rate control encoding system (300) may be configured to process coding statistics of non-final coding passes if possible and to generate coding statistics for subsequent coding passes if possible. The RC modules (RCi, j) may be configured to override decisions by the splicing module (302) regarding the initial overlapping portions. The RC modules (RCi, j) may be configured to perform these operations, even if inter-communication across the RC modules (RCi, j) with different splice indexes (different values of j) may not be available.

In some embodiments, a pre-analysis module (304) is configured to receive the input video sequence or a copy thereof and to perform analysis on the content of the video sequence. Results of the analysis and/or statistics about the content derived by the pre-analysis module (304) may be provided to the splicing module (302), which in turn may be configured to use the provided information from the pre-analysis module (304) to determine/optimize the sizes of the overlapping frames for individual splices to be processed by the RC modules (RCi, 0) in the first coding pass.

In some embodiments, the rate control modules (RCi, j) that belong to different splices (different values of i) in a coding pass (e.g., j-th coding pass) are not required to communicate with one another. Such a configuration ensures easy parallelization of the coding process, since tasks performed by the rate control modules (RCi, j) for different splices of the coding pass (j-th coding pass) do not have to be synchronized and may be independently performed by the rate control modules (RCi, j).

In some embodiments, the rate control modules (RCi, j) that belong to different splices (different values of i) in one or more coding passes (with one or more j values) are allowed to communicate with one another. Such a configuration may require synchronization among tasks performed by the rate control modules (RCi, j) for different splices of the one or more coding passes (with the one or more j values), thereby result in some slowdown since the rate control modules (RCi, j) have to communicate with one another. However, performance may benefit since information from other splices may be available to a rate control module for a specific splice. Such information may include, but is not limited to, that derived from non-overlapping frames. Communication between the rate control modules (RCi, j) also helps to more accurately achieve the target bit rate for the overall video sequence.

As shown in FIG. 3, splices (e.g., Ni, j) in a prior coding pass (e.g., j=0, 1, ..., or (P−2)) may consider no fewer frames than corresponding splices (Ni, k) in a later coding pass (k=j+1, j+2, etc.). A rate control algorithm implemented by a rate control module (RCi, P−1) for a splice (Mi) in the final coding pass (P−1) may take into account information derived in overlapping frames one or more splices (e.g., Ni−1, P−2, Ni+1, P−2, etc.) in one or more prior coding passes (e.g., j=0, 1, ..., or (P−2)) to optimize bit allocation for the final coding pass (P−1). In some embodiments, some of the one or more splices (Ni−1, P−2, Ni+1, P−2, etc.) in the one or more prior coding passes (j=0, 1, ..., or (P−2)) correspond to one or more neighboring splices (Mi−1 and Mi+1) of the splice (Mi) in the final coding pass (P−1). In some embodiments, the overlapping frames in the one or more prior coding passes (j=0, 1, ..., or (P−2)) comprise at least some overlapping frames in the neighboring splices (Mi−1 and Mi+1) in the final coding pass (P−1).

If, for example, in coding the current splice (Mi), overlapping frames in a neighboring splices (Mi−1 or Mi+1) are of higher average complexity (more difficult to code or more critical for subjective quality), the rate control module (RCi, P−1), or the rate control algorithm performed thereby, may be configured to reduce the number of bits allocated to the current splice (Mi) during the final coding pass (P−1) so that bits can be saved and used when coding the neighboring splices (Mi−1 or Mi+1) with higher complexity. On the other hand, if the overlapping frames in neighboring splices (Mi−1 or Mi+1) are of lower average complexity (less difficult to code or less critical for subjective quality), the rate control module (RCi, P−1), or the rate control algorithm performed thereby, may be configured to increase the number of bits allocated to the current splice (Mi) during the final coding pass (P−1).

The process as described above may be iterated for all splices of the input video sequence from a first coding pass to the final coding pass.

In some embodiments, the iteration of the process may be independently performed for each individual splice of the input video sequence because rate control modules (RCi, j) for a current splice (e.g., the i-th splice) of the input video sequence may obtain information about its neighboring splices through overlapping frames considered in prior coding passes without obtaining the information about its neighboring splices from rate control modules (RCi−1, j and RCi+1, j) that process the neighboring splices. For example, a chain of rate control modules (e.g., formed by RCi, 0, RCi, 1, ..., and RCi, P−1) that is configured to generate a splice-level coded bitstream for an i-th splice of the input video stream may run independently (e.g., in parallel) without communicating with other chains of rate control modules (e.g., formed by RCi−1, 0, RCi−1, 1, ..., and RCi−1, P−1) that are configured to generate splice-level coded bitstreams for other splices (e.g., i−1) of the input video stream.

Additionally, optionally, or alternatively, inter-splice communication or byte stuffing with pre-determined buffer levels may also be used to coordinate the processing of different splices. Additionally, optionally, or alternatively, a large number of splices may be used to divide the input video sequence. For example, in some embodiments, a chain of rate control modules (e.g., formed by RCi, 0, RCi, 1, . . . , and RCi, P−1) that is configured to generate a splice-level coded bitstream for an i-th splice of the input video stream may run cooperatively (e.g., in parallel but with synchronization or coordination as necessary) and communicate with other chains of rate control modules (e.g., formed by RCi−1, 0, RCi−1, 1, . . . , and RCi−1, P−1) that are configured to generate splice-level coded bitstreams for other splices (e.g., i−1) of the input video stream.

In some embodiments, a bitstream multiplexer (306) in the multi-pass rate control encoding system (300) may be configured to generate, based on splice-level coded bitstreams from the final coding pass (P−1), a compressed video bitstream as output.

Figure 4:
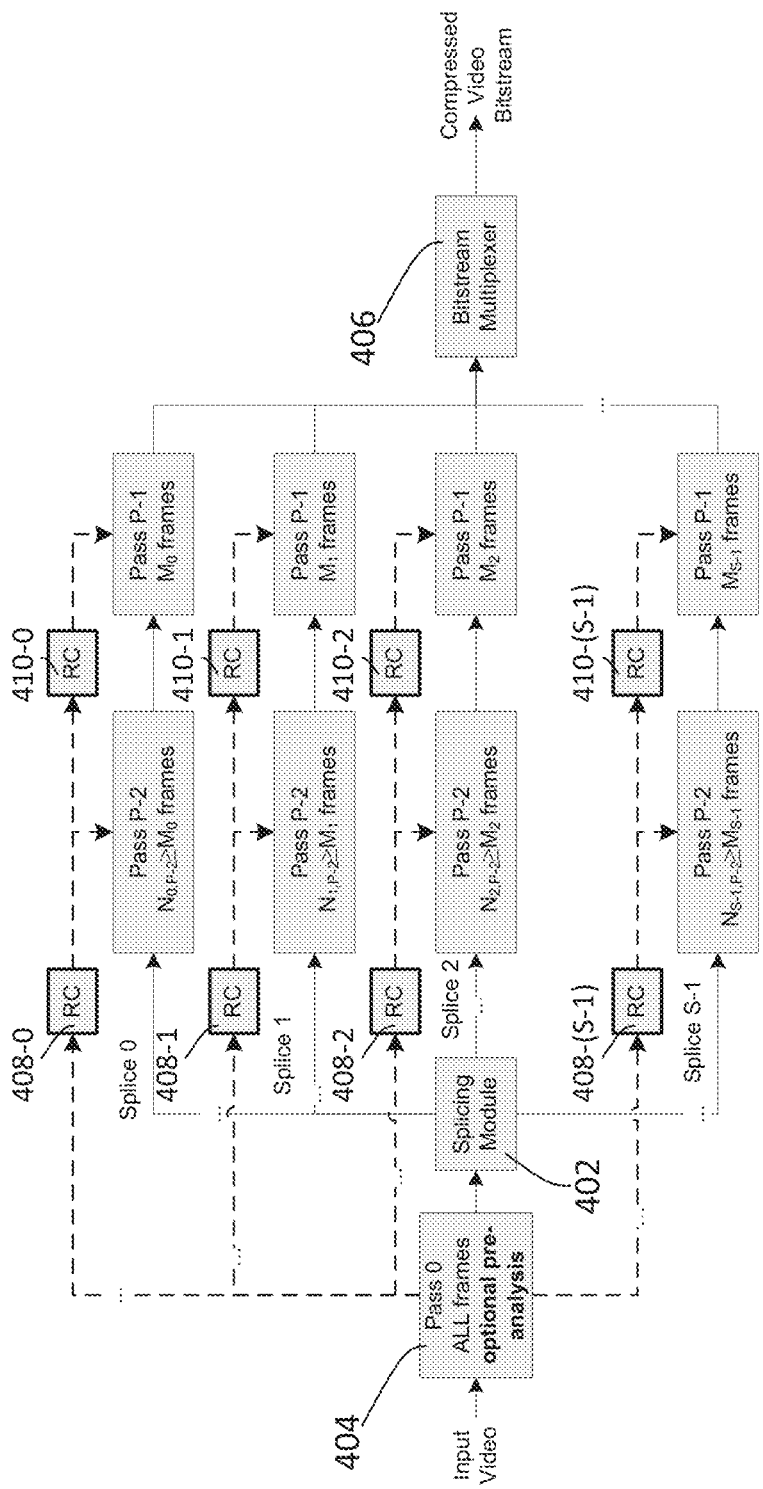
FIG. 4 illustrates a block diagram of a multi-pass rate control encoding system (300), in an example embodiment.

FIG. 4 illustrates a block diagram of a multi-pass rate control encoding system (300), in an example embodiment. In some embodiments, the number of splices in each coding pass may not be the same. For example, the i-th coding pass may comprise more or fewer splices than the j-th coding pass. Thus, in these embodiments, the number of splices, S, may vary from one coding pass to another coding pass. Information derived in a prior coding pass may comprise identifiers which a later coding pass may be configured to use to determine whether the information pertains to nearby (which may or may not be neighbors) or neighboring splices to a current splice in a later coding pass. The identifiers may be, but are not limited to, unique frame numbers. In some embodiments, all coding passes may comprise more than one splice. In some embodiments, at least one coding pass may comprise only one splice.

In some embodiments, a splice in a prior coding pass may overlap more than one splice of the final coding pass. In a particular embodiment, one of one or more prior coding passes may comprise an entire video sequence as a single splice. For example, as illustrated in FIG. 4, in the first coding pass, pre-analysis (404) may be first run over the entire video sequence as a single splice, or alternatively two or more splices each covering one or more splices of the final coding pass (P−1). In some embodiments, a single processor or machine may perform this coding pass. In some embodiments, a splicing module (402) in the multi-pass rate control encoding system may be configured to split the input video sequence into multiple splices following the first coding pass. Information derived from the coding pass related to the entire video sequence may be provided to one, two, or more machines or processors (e.g., rate control modules 408-0 through 408-(S-1), . . . , and 410-0 through 410-(S-1)) that perform one or more subsequent coding passes including the final coding pass.

Overlapping information (derived from overlapping frames of one or more prior coding passes before the final coding pass) may be used in mitigating violations of maximum average bit rate and decoder buffering constraints. As noted previously, in some embodiments, a rate control module for a splice (e.g., i-th splice) in the final coding pass calculates all bit targets as if both overlapping and non-overlapping frames would have been coded. Additionally, optionally, or alternatively, during the calculation, the rate control module may also be configured to use the buffering and maximum average bit rate constraints. During actual encoding of Mi frames in the splice, the rate control module adopts those target bit rates. Doing so may ensure optimal compliance (relative to not allocating bits for overlapping frames) with the buffering/delay and maximum average bit rate constraints including but not limited to reference decoder considerations/behaviors that would be configured to decode a resultant compressed video bitstream.

Additionally, optionally, or alternatively, in FIG. 3 and FIG. 4, one or more coding passes before the final coding pass may not be full-complexity coding passes, but some low-complexity coding passes. Additionally, optionally, or alternatively, such a coding pass may also be replaced by a pre-processor analysis pass that does not produce any coded bitstreams but instead produces statistics that may be useful to a rate control algorithm performed in a later coding pass. Additionally, optionally, or alternatively, complexity in a non-final coding pass may be further reduced by utilizing spatial and/or temporal subsampling techniques. For instance, a non-final coding pass or a pre-analysis pass may use lower complexity coding tools (which may or may not use multiple splices with overlapping frames, one or more initial splices covering multiple splices in the final coding pass, etc.). Subsequent passes may use temporal sub-sampling to derive one or more translation relationships that may be used to correct complexity statistics before the complexity statistics are used in the last coding pass.

4. Example Process Flows

Figure 5A:
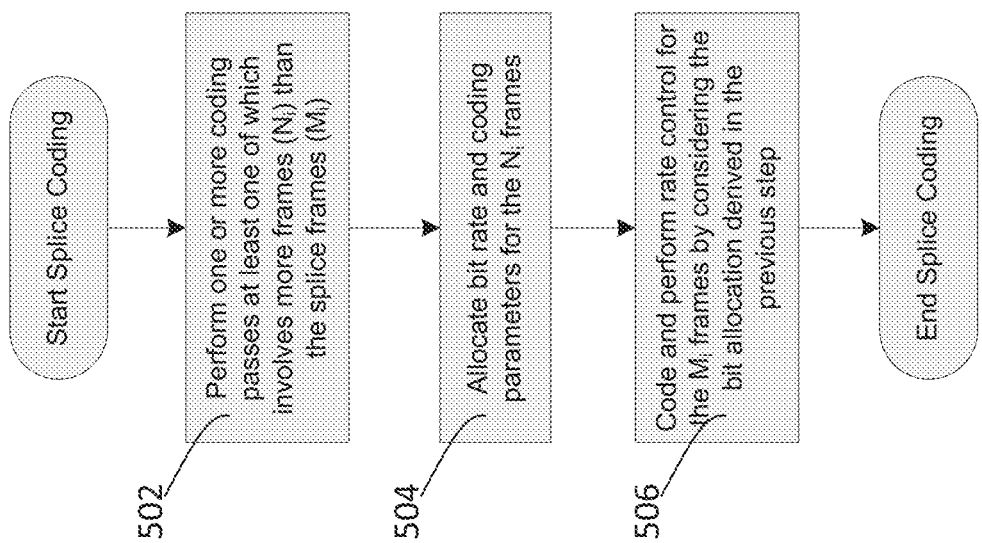
FIG. 5A and FIG. 5B illustrate a method of processing an input video sequence, in an example embodiment.

FIG. 5A illustrates a method of processing an input video sequence, in an example embodiment. In block 502, a multi-pass encoding system as described herein performs one or more coding passes at least one of which involves more frames (e.g., Ni of FIG. 2, where i=1, 2, 3, etc.) than the splice frames (Mi). As used herein, the term "the splice frames" refer to Mi frames in a final splice that corresponds to a non-final splice comprising the Ni frames. Thus, Ni frames comprise overlapping frames that are not actually coded in the final coding pass.

In block 504, the multi-pass encoding system allocates bit rate and coding parameters for the Ni frames. In block 506, the multi-pass encoding system codes and performs rate control for the Mi frames by considering the bit allocation derived in block 504.

In some embodiments, the allocation of the bit rate and coding parameters is based on coding Mi frames in the final coding pass. Thus, in these embodiments, the overlapping frames may be used to provide complexity information about neighboring final splices, but are not allocated bits or performance budgets since the overlapping frames are not coded in the final coding pass.

In some embodiments, the allocation of the bit rate and coding parameters is based on coding Ni frames in the final coding pass. Thus, in these embodiments, extra bits and performance budgets are allocated for the overlapping frames as if the overlapping frames were to be coded in the final coding pass. The multi-pass encoding system may use the extra bits and performance budgets to improve the subjective and objective quality of a coded bitstream generated from the Mi frames of the final splice.

Figure 5B:
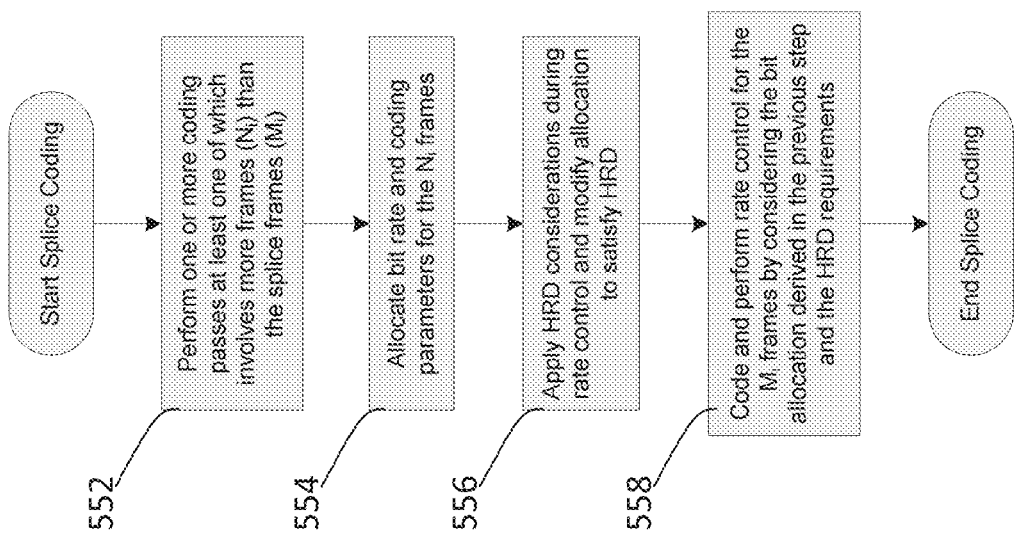

FIG. 5B also illustrates a method of processing an input video sequence, in an example embodiment. In block 552, a multi-pass encoding system as described herein performs one or more coding passes at least one of which involves more frames (e.g., Ni of FIG. 2, where i=1, 2, 3, etc.) than the splice frames (Mi) in the final coding pass.

In block 554, the multi-pass encoding system allocates bit rate and coding parameters for the Ni frames.

In block 556, the multi-pass encoding system applies hypothetical reference decoder (HRD) considerations during rate control operations and modifies the allocation derived in block 554 to satisfy the constraints relating to HDR. In block 558, the multi-pass encoding system codes and performs rate control for the Mi frames by considering the bit allocation derived in blocks 554 and 556.

The allocation of the bit rate and coding parameters may be based on coding Mi frames in the final coding pass or based on coding Ni frames in the final coding pass.

Figure 6:
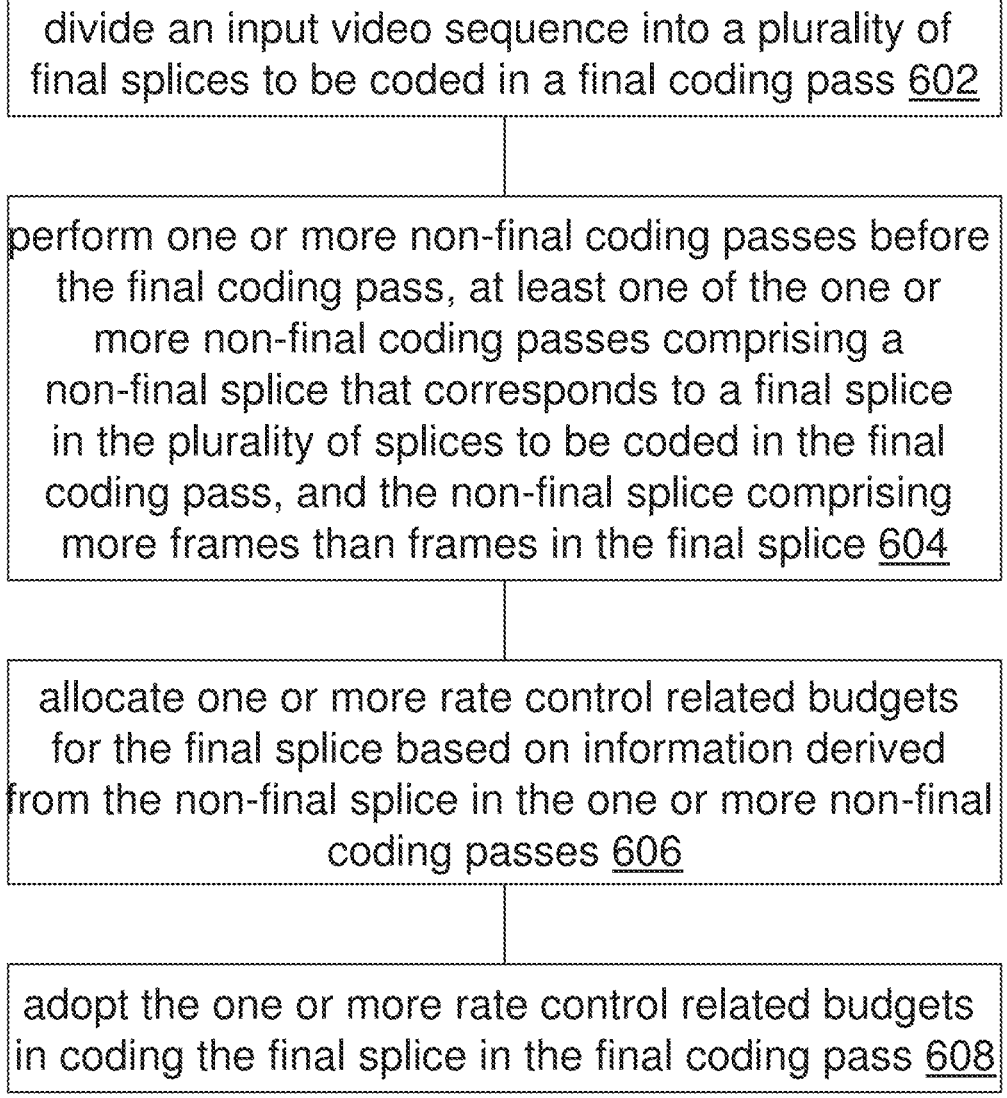
FIG. 6 illustrates a process flow, according to example embodiments.

FIG. 6 illustrates a process flow according to an example embodiment of the present invention. In some example embodiments, one or more computing devices or components may perform this process flow. In block 602, a multi-pass encoding system (e.g., as illustrated in FIG. 3 or FIG. 4) divides an input video sequence into a plurality of final splices to be coded in a final coding pass.

In block 604, the multi-pass encoding system performs one or more non-final coding passes before the final coding pass. At least one of the one or more non-final coding passes comprises a non-final splice that corresponds to a final splice in the plurality of splices to be coded in the final coding pass. The non-final splice may comprise more frames than frames in the final splice.

In block 606, the multi-pass encoding system allocates one or more rate control related budgets for the final splice based on information derived from the non-final splice in the one or more non-final coding passes.

In block 608, the multi-pass encoding system adopts the one or more rate control related budgets in coding the final splice in the final coding pass.

In some embodiments, the one or more rate control related budgets include one or more of a quantization parameter, a total number of header bits or a total number of texture bits allocated to a splice-level bit stream coded from the final splice.

In some embodiments, the one or more rate control related budgets include one or more coding parameters (e.g., one or more quantization parameters) to be used by one of the one or more non-final coding passes or by the final coding pass.

In some embodiments, the one or more rate control related budgets comprises one or more of target bit rates, maximum average bit rates, or one or more constraints related to a reference decoder configured to decode a compressed video bitstream generated in part by the final coding pass.

In some embodiments, frames considered in the non-final splice comprise overlapping frames that overlap with one or more final splices neighboring the final splices; the information derived from the non-final splice in the one or more non-final coding passes comprises an indication of the complexity of the one or more final splices. The multi-pass encoding system is further configured to increase allocated bits to the final splice in response to determining that the indication of complexity informs that the final splice is of a higher complexity than that of the one or more final splices neighboring the final splices and to reduce allocated bits to the final splice in response to determining that the indication of complexity informs that the final splice is of a lower complexity than that of the one or more final splices neighboring the final splices.

In some embodiments, the final splice is processed by a chain of processing, which comprises one or more of non-final rate control modules or a final rate control module. In some embodiments, the chain of processing performs rate control operations on the final splice without communicating with other chains of processing comprising other rate control modules; here, the other chains of processing perform rate control operations on other final splices in the plurality of final splices. In some embodiments, the chain of processing performs rate control operations on the final splice by communicating with at least one of other chains of processing comprising other rate control modules that perform rate control operations on other final splices in the plurality of final splices.

In some embodiments, at least one of the one or more non-final coding passes generates statistics about overall content or complexity of the input video content.

In some embodiments, at least one of the one or more non-final coding passes comprises a different number of splices than that in the final coding pass.

In some embodiments, the multi-pass encoding system is further configured to perform receiving processing capabilities of a reference decoder; and adjusting the one or more rate control related budgets based at least in part on the processing capabilities of the reference decoder.

In some embodiments, the multi-pass encoding system is further configured to perform at least one of temporal subsampling operations or spatial subsampling operations on the non-final splice; and generate the information derived from the non-final splice based on subsampled frames in the non-final splice.

In some embodiments, both the non-final splice and the final splice are members in a set of corresponding splices, each member of the set from a different coding pass among the non-final coding passes and the final coding pass; a first coding pass is before a second coding pass among the non-final coding passes and the final coding pass; and first frames considered in a first splice in the set of corresponding splices in the first coding pass are more than second frames considered in a second splice in the set of corresponding splices in the second coding pass.

In some embodiments, the non-final splice belongs to a coding pass immediately preceding the final coding pass; the one or more rate control related budgets are generated by modifying one or more previous rate control related budgets derived in a second non-final splice belonging to a second coding pass before the coding pass.

In some embodiments, frames considered in the non-final splice comprises non-overlapping frames that do not overlap with one or more final splices neighboring the final splices and overlapping frames that overlap with the one or more final splices neighboring the final splices; the information derived from the non-final splice in the one or more non-final coding passes comprises one or more bit budgets allocated for coding the non-overlapping frames only. In some other embodiments, the information derived from the non-final splice in the one or more non-final coding passes comprises one or more bit budgets allocated for coding both the non-overlapping frames and the overlapping frames.

In some embodiments, at least two coding passes, among the one or more non-final coding passes and the final coding pass, comprise multiple splices, respectively. In some embodiments, at least one of the one or more non-final coding passes comprises a single splice for the entire input video sequence.

In some embodiments, the multi-pass encoding system is further configured to perform converting one or more input images represented, received, transmitted, or stored with one or more input video signals into one or more output VDR images represented, received, transmitted, or stored with one or more output video signals.

In some embodiments, the input video sequence comprises image data encoded in at least one of: a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space, or a YCbCr color space.

In various example embodiments, an encoder, a decoder, a system, an apparatus, or one or more other computing devices performs any or a part of the foregoing methods as described.

5. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
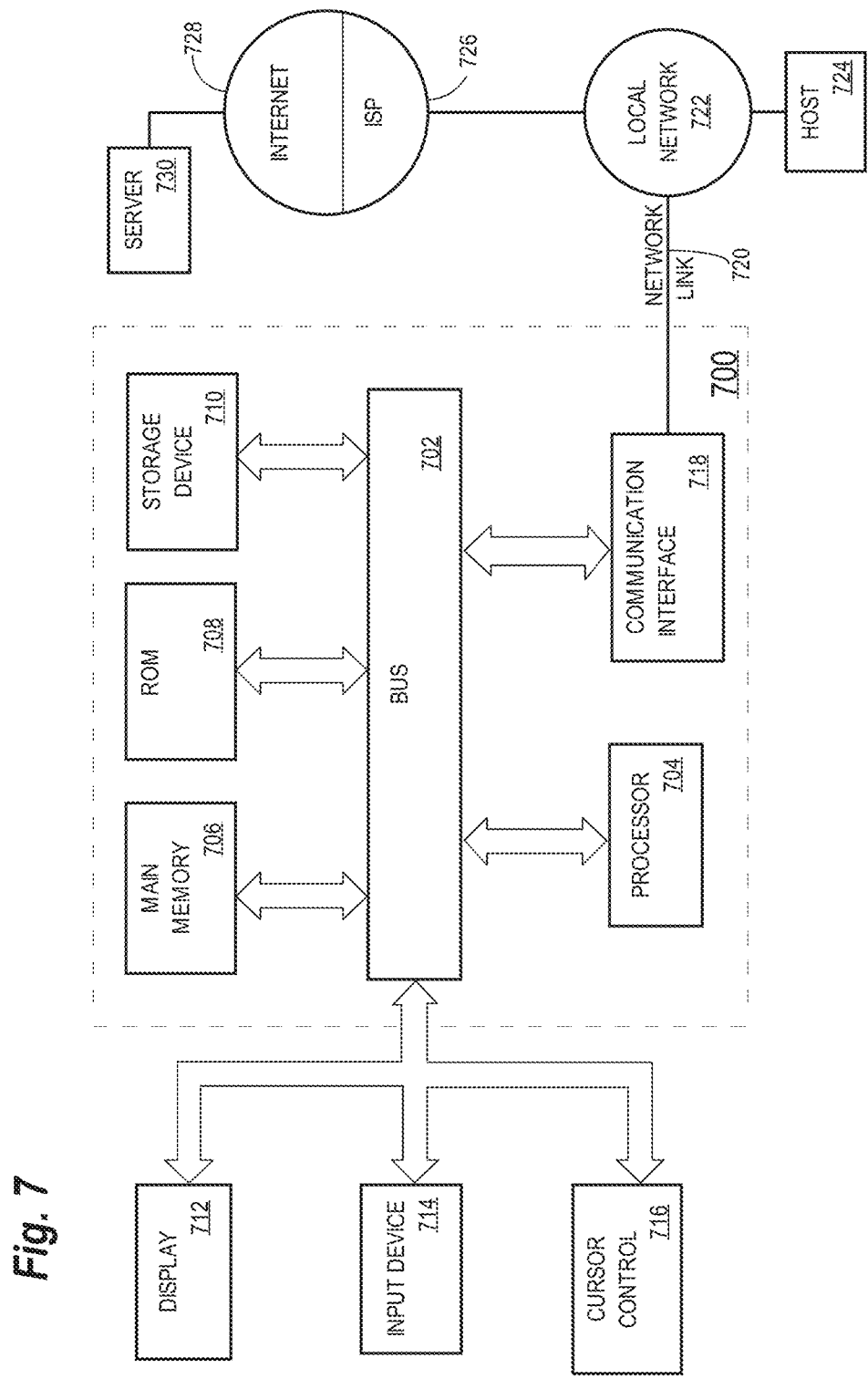
FIG. 7 illustrates an example hardware platform on which a computer or a computing device as described herein may be implemented, according to an embodiment of the present invention.

For example, FIG. 7 is a block diagram that illustrates a computer system 700 upon which an example embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6. Equivalenets, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A video system comprising:
   at least one non-transitory storage medium;
   a first compressed segment for a first period of a video sequence, the first compressed segment compressed at a first quality and stored by the at least one non-transitory storage medium;
   a second compressed segment for the first period of the video sequence, the second compressed segment compressed at a second quality and stored by the at least one non-transitory storage medium, wherein the first compressed segment includes more frames than the second compressed segment;
   a third compressed segment for a second period of the video sequence stored by the at least one non-transitory storage medium; and
   a two-way communication interface configured to stream a compressed video bitstream and receive instructions over a network;
   wherein:
   (i) the first and second periods are adjacent and non-overlapping;
   (ii) the first and second qualities differ, the second quality being higher than the first quality;
   (iii) the first and third segments are coded independently; and
   (iv) the compressed video bitstream includes the third compressed segment and the second compressed segment.

2. A two-way communication system to stream a video sequence, the system comprising:
   at least one non-transitory storage medium;
   a first compressed segment for a first period of the video sequence, the first compressed segment compressed at a first quality and stored by the at least one non-transitory storage medium;
   a second compressed segment for the first period of the video sequence, the second compressed segment compressed at a second quality and stored by the at least one non-transitory storage medium, wherein the first compressed segment includes more frames than the second compressed segment;
   a third compressed segment for a second period of the video sequence stored by the at least one non-transitory storage medium, and
   a two-way communication interface configured to stream the video sequence,
   wherein:
   (v) the first and second periods are adjacent and non-overlapping;
   (vi) the first and second qualities differ, the second quality being higher than the first quality;
   (vii) the first and third segments are coded independently; and
   (viii) the compressed video bitstream includes the third compressed segment and the second compressed segment.

* * * * *